United States Patent [19]

Norris

[11] 4,215,377
[45] Jul. 29, 1980

[54] MULTI-SPEED TAPE CASSETTE SYSTEM

[76] Inventor: Elwood G. Norris, 1520 Canterbury Dr., Salt Lake City, Utah 84108

[21] Appl. No.: 949,752

[22] Filed: Oct. 10, 1978

[51] Int. Cl.² .................. G11B 15/46; G11B 15/00
[52] U.S. Cl. ................................ 360/73; 360/96.1; 360/132
[58] Field of Search ............... 360/73, 93, 94, 137, 360/63, 61, 132, 96.1

[56] References Cited

U.S. PATENT DOCUMENTS

| | | | |
|---|---|---|---|
| 3,685,171 | 8/1972 | Kosaka | 360/132 |
| 3,742,320 | 6/1973 | Ban | 360/73 |
| 4,057,839 | 11/1977 | Banks | 360/93 |
| 4,090,224 | 5/1978 | Sato | 360/132 |

*Primary Examiner*—Vincent P. Canney
*Attorney, Agent, or Firm*—Thorpe, North & Gold

[57] ABSTRACT

A multi-speed tape cassette system includes a tape cassette having a removable tab centrally located over a cavity disposed on the leading edge thereof, and a tape player operable to reproduce information contained on the tape cassette at one speed if the cassette tab is in place, and at another speed if the cassette tab is removed. The tape player includes a receptacle for receiving and holding the cassette, a two-position control switch normally biased to a second position, and operable to a first position when the tape cassette including the tab is placed in the receptacle. The control switch remains in the second position when the cassette with the tab removed is placed in the receptacle. The tape player also includes apparatus responsive to the control switch being in the first position for operating the tape cassette at the normal speed, and responsive to the control switch being in the second position for operating the tape cassette at a lower speed. The control switch includes a plunger element positioned at one side of the receptacle to protrude into the cassette cavity wnen the tab is removed and the cassette is placed in the receptacle. When the cassette tab is not removed, the tab forces the plunger into the receptacle wall as the cassette is being placed in the receptacle.

10 Claims, 3 Drawing Figures

U.S. Patent  Jul. 29, 1980  4,215,377
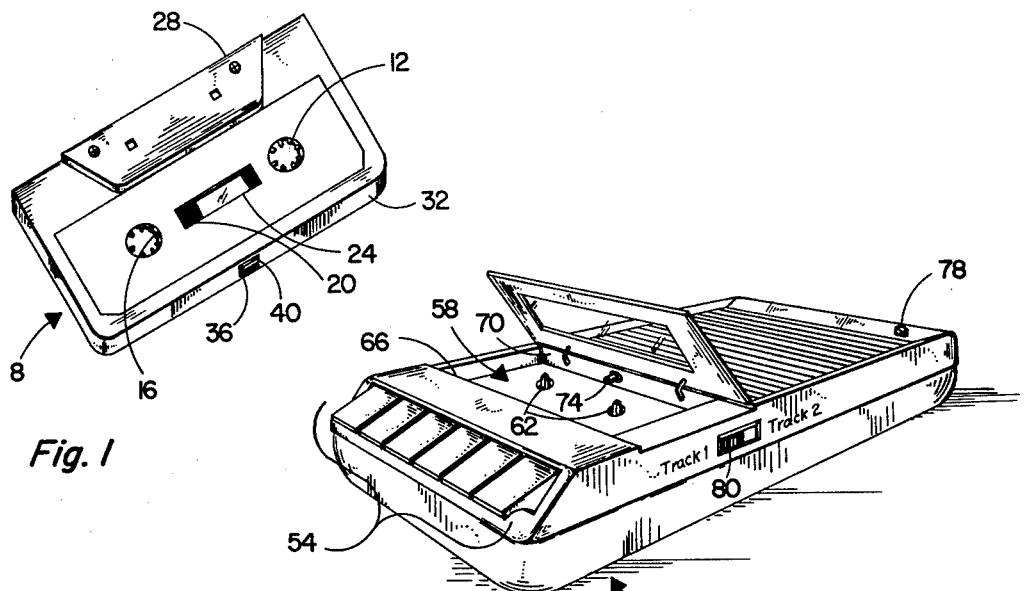
Fig. 1
Fig. 2
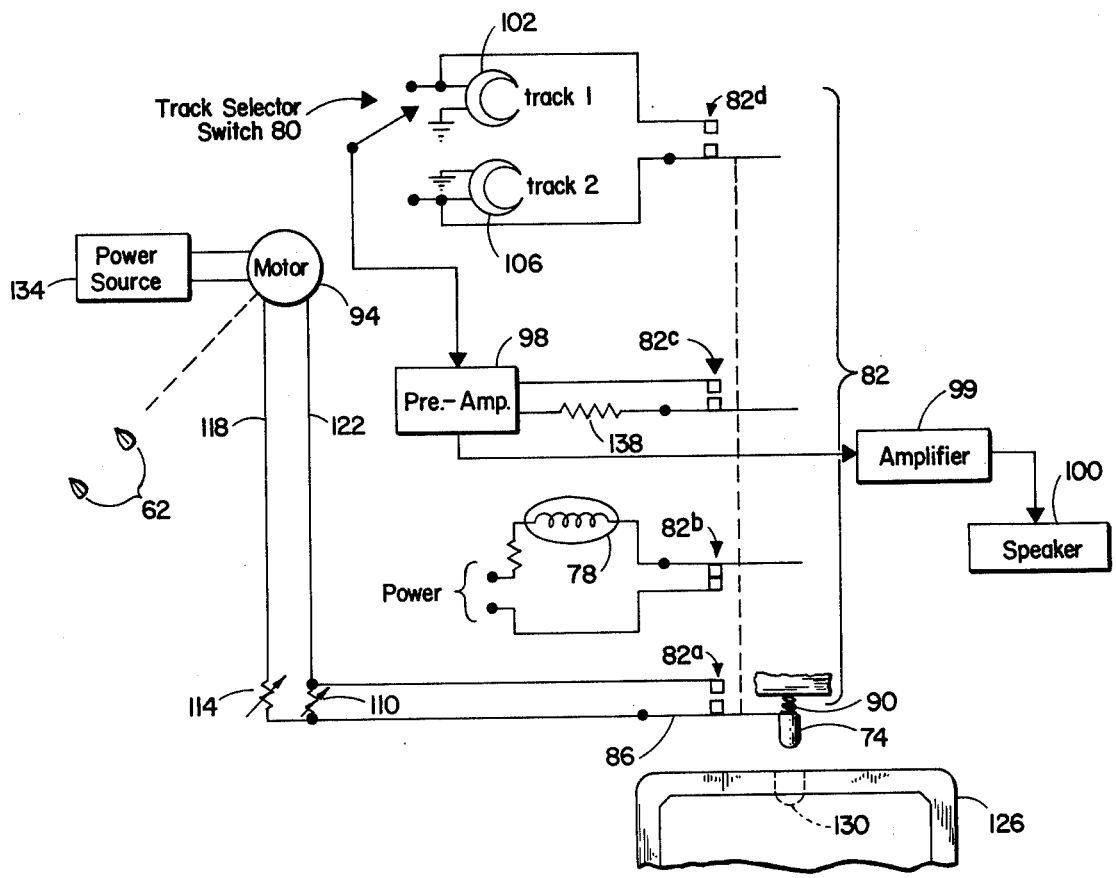
Fig. 3

MULTI-SPEED TAPE CASSETTE SYSTEM

BACKGROUND OF THE INVENTION

The present invention relates to a tape cassette player which may be automatically conditioned to operate at either of two speeds depending upon the type of cassette placed in the tape player.

Tape recorders and reproducers which utilize reel to reel tape cassettes have become quite popular for recording and playing back music, for recording speeches or conversations for later use, and, of course, for purchasing prerecorded tape cassettes containing music or narratives. In conjunction with such popularity, there has been a desire to increase the amount of information which can be recorded on tape to thereby reduce the cost of recording. It is felt that if such costs can be sufficiently reduced, then new markets for tapes can be developed such as the recording of entire books on tape, the recording of lengthy dramatic presentations, etc.

Of course, any developments which would reduce the cost of recording should be compatible with existing tape recorders and reproducers and existing tape cassettes so that such recorders and reproducers and cassettes would not become instantly obsolete upon introduction of the new development. That is, it would be desirable to preserve the utility of existing tape apparatus and equipment while also allowing for the introduction of new developments which would reduce the cost of recording and storing information.

SUMMARY OF THE INVENTION

It is an object of the invention to provide a multi-speed tape cassette system having a tape player operable at either of at least two speeds depending upon what type of cassette is inserted into the player.

It is another object of the invention to provide such a system which includes tape cassettes having control elements which condition tape players to operate at either of at least two speeds.

It is a further object of the invention to provide a multi-speed tape cassette system in which a tape player may operate at either normal speed when a conventional cassette is placed in the tape player, or at a different speed when a tape cassette having a certain control element is placed therein.

The above and other objects of the invention are realized in a specific illustrative embodiment thereof which includes a tape player operable to record and play back information contained on a tape cassette at least at two speeds, such tape player including a receptacle for receiving and holding a tape cassette, a control switch for assuming a first condition when a tape cassette having a switch operate member is inserted into the receptacle and for assuming a second condition when a tape cassette lacking the switch operate member is placed in the receptacle, and apparatus responsive to the first condition of the control switch for operating a tape cassette at a first speed, and responsive to the second condition of the control switch for operating a tape cassette at a second speed. Also included in the system is a tape cassette which has a switch operate member which may be manually adjusted to cause the control switch to assume either the first or second condition.

With the system described above, certain kinds of information such as narratives, speeches, etc., can be recorded on a cassette and played back at a slower speed than normal to increase the amount of information stored on the tape without seriously affecting the quality of the playback. For those cassettes containing information recorded at the slower speed, a control element on the cassette is arranged to automatically cause operation of a tape player into which a cassette is inserted at the slower speed. On the other hand, if conventional tape cassettes are inserted in such a tape player, the tape player is conditioned to play at the normal speed. In this fashion, large amounts of information can be recorded on tape cassettes at a slower speed thus reducing recording costs.

BRIEF DESCRIPTION OF THE DRAWINGS

The above and other objects, features and advantages of the present invention will become apparent from a consideration of the following detailed description presented in connection with the accompanying drawings in which:

FIG. 1 shows a perspective view of a tape cassette made in accordance with the present invention;

FIG. 2 shows a perspective view of a tape player or cassette recorder and reproducer made in accordance with the present invention; and FIG. 3 is a schematic of a portion of the circuitry of FIG. 2 utilizing the principles of the present invention.

DETAILED DESCRIPTION

FIGS. 1 and 2 show respectively a tape cassette and tape player made in accordance with the present invention. The cassette 8 of FIG. 1 is conventional in design to include two reels 12 and 16 upon which a tape 20, shown through a window 24, is wound. The cassette 8 includes a play edge 28 adjacent to which the tape is guided to allow contact by a read head of a tape player into which the cassette may be inserted. Oppositely disposed of the play edge 28 is a leading edge 32 in which is formed an opening 36, with a knock-out tab 40 constructed to extend over the opening. The opening 36 and tab 40 are positioned centrally in the leading edge 32 so that when the cassette 8 is turned over the opening and tab will remain in substantially the same position in a tape player in which the cassette is placed. That is, regardless of which way (which side up) the cassette is placed in the tape player, the opening 36 and tab 40 will occupy the same location in the tape player and so will operate the tape player from either side.

As will be explained in further detail later, if information is recorded on the cassette 8 at the conventional speed, then the tab 40 is left in place so that the cassette 8 "appears" to be a conventional cassette. When information is recorded on the cassette 8 at the slower speed to be reproduced or played back at that same slower speed, then the knock-out tab 40 is removed leaving the opening 36 exposed. Thus, depending upon the presence or absence of the tab 40, a tape player into which the cassette is placed will be conditioned to either play at the conventional speed or at the slower speed.

FIG. 2 shows a tape player 50 having the standard control keys 54 for controlling the recording and reproduction of information on tapes inserted into the player. Such keys might include "record", "play", "rewind", "fast forward", "stop", "eject", etc., of a conventional tape system. The tape player 50 also includes a conventional receptacle 58 into which a cassette is placed for either recording or reproducing information. Two spindles 62 project from a bottom wall of the receptacle for causing the reels of a cassette to rotate to thereby move the tape past the record and reproduction mechanisms of the tape player 50 (not shown in FIG. 2). Such mechanisms are positioned adjacent a front wall 66 of the receptacle 58.

Disposed to protrude from a back or opposite wall 70 of the receptacle 58 is a spring-biased nipple 74. The nipple protrudes from the wall 70 to engage the leading edge of a conventional cassette inserted in the receptacle 58 so that the nipple is forced into the wall. If the cassette 8 of FIG. 1, with the tab 40 removed, is inserted into the receptacle 58, then the nipple 74 is received into the opening or cavity 36 of the cassette. Thus, depending upon the type of cassette introduced into the receptacle 58, the nipple 74 will either remain in the extended position where it protrudes from the rear wall 70, or will be forced into the wall. When forced into the wall, the nipple 74 causes the operation of a switch which causes the tape player 50 to operate at the conventional speed. When the nipple 74 remains in the extended position because it is received into the opening 36 of the cassette 8, then the tape player 50 is caused to operate the cassette at a slower speed. This includes driving the spindles 62 at a slower speed as well as performing certain other functions.

When the nipple 74 remains in the extended position and the tape player 50 operates at the slower speed, then a lamp (or other light-emitting device) 76 is caused to light to indicate to the user that the tape player is operating at the slower speed. Other functions controlled by the position of the nipple 74 will next be discussed.

FIG. 3 shows an exemplary circuit schematic of the tape player 50 of FIG. 2. This schematic includes a two-position switch 82 operable by an armature 86 on which the nipple 74 is mounted. The armature 86 and nipple 74 are biased by a spring 90 into the extended position in which the nipple protrudes from the back wall 70 of the receptacle 58 (FIG. 2). The armature 86 is mechanically connected to other armatures to either open or close switch contacts when the nipple 74 is pushed into the back wall 70.

Different contacts of the switch 82 are connected to a motor 94, which operates at either of two speeds to drive the spindles 62, to the lamp 78, to a pre-amplifier 98, and to read heads 102 and 106. Specifically, when the nipple 74 is pushed inwardly, switch contacts 82a are caused to close to short circuit a variable resistor 110 which is connected in series with another variable resistor 114. The speed of the motor 94 is controlled by the voltage drop across leads 118 and 122, and so by short circuiting the resistor 110, the voltage drop is changed to thereby change the speed of the motor—in this case to increase the speed to its standard or normal level. When the switch contacts 82a are open, the resistor 110 is placed in series with the resistor 114 to increase the voltage drop across the leads 118 and 122 and cause a reduction in speed of the motor 94. This is the slow-speed mode described earlier for cassettes such as cassette 126 having a central tab removed to expose an opening or cavity 130. With such a cassette, the nipple 74 is received into the cavity 130 so that the switch 82 is not operated and switch contacts 82a remain open. The motor 94 and interconnection with the spindles 62 are all conventional. The motor 94 is supplied with power from a power source 134 which could be either a battery, transformer for converting a.c. power to d.c. power, or the like.

Switch contacts 82b which are connected to the lamp 78 are caused to open when the nipple 74 is pushed inward. When this occurs, the lamp 78, which is connected to a power source, is extinguished to indicate that the tape player is in the normal-speed mode. When the nipple 74 is not pushed inward, the switch contacts 82b remain closed so that current can be supplied to the lamp 78 to light the lamp, thereby providing a visual indication that the tape player is in the slow-speed mode.

When the nipple 74 is pushed inward, switch contacts 82c are caused to close to connect a resistor 138 to the pre-amplifier circuit 98. In this condition, the pre-amplifier 98 amplifies signals received from the read heads 102 and 106 by an amount suitable for a cassette played at the normal speed. When the nipple 74 is not pushed inward, the resistor is not connected to the pre-amplifier 98 so that it is caused to amplify signals received from the read heads by a greater amount. The reason for this is that the signal level of signals produced by magnetic tape read heads is lower when the tape is played at a slower speed. To compensate for this, the pre-amplifier 98 is provided to boost the gain of audio signals produced in the slow-speed mode. The pre-amplifier 98 is a conventional circuit.

The pre-amplifier 98 is coupled to an amplifier 99 which, in turn, is coupled to a speaker for reproducing audible signals from electrical signals supplied by the amplifier. This, of course, is conventional circuitry.

Switch contacts 82d are closed when the nipple 74 is pushed inward and open when the nipple is in the extended position. When in the closed position, read heads 102 and 106 are connected in parallel to operate conjointly regardless of the setting of a track selector switch 80 (also shown in FIG. 2). That is, the read heads are connected to both read from the same track of a two-track tape inserted into the tape player. When the switch contacts 82d are in the open position, the read heads 102 and 106 are not connected together so that they will read from different tracks of a four-track tape inserted into the tape player. That is, read head 102 will read from track 1 of one side of the tape and read head 106 will read from track 2 of that side. When the tape is turned over, then read head 102 will read from track one of the new side and read head 106 will read from track 2. Of course, the track selector switch 80 must be coupled to a particular one of the read heads in order for the information on the selected track to be reproduced. Thus, all four tracks of a four-track tape may be read individually when in the slow-speed mode by appropriate setting of the track selector switch 80. When in the normal-speed mode, both read heads 102 and 106 are connected together to read jointly from the single track on each side of a two-track tape.

In the manner described, a two-speed tape cassette system is provided for playing tape cassettes at either of two speeds. The system is automatically conditioned to play at one of the two speeds by the tape cassette inserted into the system. By providing a slower than normal playing speed, much more information can be recorded on the cassette tape for later reproduction.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. For example, rather than providing an opening and tab in the cassette and nipple on the back wall of the tape player receptacle, a break-off nipple could be provided on the cassette to operate a switch through an opening provided in the back wall of the receptacle. That is, the switch operate element provided on the cassette could take a variety of shapes. Other modifications could also be made such as provision of more than two speeds for the tape player, each speed being automatically selected by appropriate conditioning of several switch operate elements on a cassette.

What is claimed is:

1. A multi-speed tape cassette system comprising
a tape player operable to play back information contained on a tape cassette at least at two speeds, said tape player including
means for receiving and holding a tape cassette;
control switch means for assuming a first condition when a tape cassette having a switch operate member is placed in said receiving and holding means, and for assuming a second condition when a tape cassette lacking said switch operate member is placed in said receiving and holding means,
means responsive to the first condition of said switch means for operating a tape cassette placed in the receiving and holding means at a first speed, and responsive to the second condition of said switch means for operating a tape cassette placed in the receiving and holding means at a second speed, and
a tape cassette including a removable switch operate member for controlling operation of said control switch means when the cassette is placed in said receiving and holding means with either side up.

2. A tape cassette system as in claim 1 wherein said receiving and holding means comprises a receptacle having opposing first and second side walls, said system further including tape reading means disposed in the first side wall, and wherein said switch means is disposed in the second side wall and includes
an element movable between a first position, wherein the switch means is in the first condition, and a second position, wherein the switch means is in the second condition, and
means for normally biasing the movable element to said second position.

3. A tape cassette system as in claim 2 wherein said tape cassette includes a play edge along which tape contained in the cassette moves, and a leading edge disposed opposite the play edge, said play edge being positioned adjacent said first side wall when the tape cassette is placed in the receptacle, and said leading edge being positioned adjacent said second side wall when the tape cassette is placed in the receptacle, and wherein said switch operate member comprises a cavity located in the leading edge of said tape cassette in substantially the center thereof, and a knock-out tab disposed over the opening of the cavity.

4. A tape cassette system as in claim 3 wherein said movable element comprises a plunger which is engaged and caused to move to said first position by said knock-out tab when a tape cassette which includes the knock-out tab is placed in said receptacle, and which remains in said second position and extends into the cavity of a tape cassette when such tape cassette with the tab removed is placed in said receptacle.

5. A tape cassette system as in claim 1 further including
a light-emitting means, and
means for supplying current to light said light-emitting means when said switch means is in said second condition.

6. A tape cassette system as in claim 1 further including
a pair of read heads each disposed to read information signals from a different track of a four track tape cassette,
audio speaker means for aurally reproducing information signals applied thereto, and
manual switch means for selectively coupling said audio speaker means to one of said read heads.

7. A tape cassette system as in claim 6 further including means responsive to said control switch means being in said first condition for connecting said pair of read heads in a parallel electrical connection.

8. A tape cassette system as in claim 6 further including amplifier means responsive to said control switch means being in said first condition for amplifying the information signals read from a tape cassette by a first increment prior to application thereof to said audio speaker means, and responsive to said control switch means being in said second condition for amplifying the information signals by a second increment different from said first increment.

9. A multi-speed tape player for use with either a conventional tape cassette or a tape cassette having an opening and a knock-out tab located thereover and centrally positioned on the leading edge of the cassette, said tape player including
a receptacle for receiving and holding a tape cassette,
switch means disposed adjacent said receptacle and including
a movable element positioned for engagement and movement to a first position by said knock-out tab when a tape cassette containing the tab is placed in the receptacle, and for reception into the openings of the cassette for maintenance for the movable element in a second position when a cassette with the knock-out tab removed is placed in the receptacle, and
means for biasing said movable element to said second position, and
means responsive to said movable element being in the first position for operating a tape cassette placed in said receptacle at a first speed, and responsive to said movable element being in the second position for operating a tape cassette placed in said receptacle at a second speed different from said first speed.

10. A tape cassette for use with a tape player having a receptacle for receiving and holding a tape cassette, switch means disposed adjacent said receptacle and including a switch element which may be moved to a first position by placement of a certain type tape cassette in said receptacle, and which is normally biased to a second position,
means responsive to said movable element being in the first position for operating a tape cassette placed in said receptacle at a first speed, and responsive to said movable element being in the second position for operating a tape cassette placed in said receptacle at a second speed different from said first speed,
said tape cassette including a housing having a play edge and a leading edge disposed opposite the play edge, said leading edge having a centrally positioned opening therein and a knock-out tab disposed over the opening, said tab engaging and moving said switch element to said first position when the tape cassette containing the tab is placed in said receptacle, and said switch element being received into the tape cassette opening so that it remains in said second position when the tape cassette with the tab removed is placed in said receptacle, and a tape windably mounted in the housing so that the tape travels along the play edge of the housing.

* * * * *